(12) United States Patent
Floyd et al.

(10) Patent No.: US 10,514,123 B2
(45) Date of Patent: Dec. 24, 2019

(54) TAPPING SLEEVE WITH BENT ENDS

(71) Applicant: Mueller International, LLC, Atlanta, GA (US)

(72) Inventors: Scott P. Floyd, Whitwell, TN (US); Charles Graham Hines, Chattanooga, TN (US); Daryl Lee Gibson, Cleveland, TN (US)

(73) Assignee: Mueller International, LLC, Atlanta, GA (US)

(*) Notice: Subject to any disclaimer, the term of this patent is extended or adjusted under 35 U.S.C. 154(b) by 460 days.

(21) Appl. No.: 15/066,441

(22) Filed: Mar. 10, 2016

(65) Prior Publication Data

US 2017/0261144 A1 Sep. 14, 2017

(51) Int. Cl.
   *F16L 41/12* (2006.01)
(52) U.S. Cl.
   CPC .................... *F16L 41/12* (2013.01)
(58) Field of Classification Search
   CPC . F16L 41/12; F16L 41/00; F16L 41/04; F16L 29/002
   USPC ......... 285/133.3, 415, 15–16, 197–199, 373, 285/419
   See application file for complete search history.

(56) References Cited

U.S. PATENT DOCUMENTS

| | | | | | |
|---|---|---|---|---|---|
| 2,616,736 A | * | 11/1952 | Smith | ..................... | F16L 41/12 138/99 |
| 2,684,859 A | * | 7/1954 | Longley | ................ | F16L 41/002 285/14 |
| 3,558,162 A | * | 1/1971 | Ferrai et al. | ............ | F16L 41/06 24/277 |
| 3,779,272 A | * | 12/1973 | Dunmire | ................. | F16L 41/06 137/315.01 |
| 3,792,879 A | * | 2/1974 | Dunmire | ............... | F16L 41/002 137/318 |
| 4,653,782 A | * | 3/1987 | Munday | ................ | F16L 55/172 285/15 |

(Continued)

FOREIGN PATENT DOCUMENTS

| | | | | | |
|---|---|---|---|---|---|
| FR | | 821841 A | * | 12/1937 | ............... F16L 41/12 |
| FR | | 51614 E | * | 3/1943 | ............... F16L 19/06 |
| FR | | 2678350 A1 | * | 12/1992 | ............... F16L 41/12 |

OTHER PUBLICATIONS

Ayotte Enterprises Inc.; Specification Sheet for Ayotte A-320 Carbon Steel Tapping Sleeve titled "Manchon De Perforation A-320," publicly available prior to Mar. 10, 2015, 1 pg.

(Continued)

*Primary Examiner* — Anna M Momper
*Assistant Examiner* — Fannie C Kee
(74) *Attorney, Agent, or Firm* — Taylor English Duma LLP (57) ABSTRACT

A tapping sleeve includes a first bend line in a planar outlet band between a first side end and a second side end of the planar outlet band, the first bend line extending from a front end to a back end of the planar outlet band, a first outlet flange defined between the first side and the first bend line; a second bend line in the planar outlet band between the first bend line and the second side end, the second bend line extending from the front end to the back end of the planar outlet band, a second outlet flange defined between the second side and the second bend line; and an arcuate portion formed between the first bend line and the second bend line.

13 Claims, 9 Drawing Sheets

(56) References Cited

U.S. PATENT DOCUMENTS

| | | | | | |
|---|---|---|---|---|---|
| 4,708,373 | A | * | 11/1987 | Morriss, Jr. | F16L 41/12 277/616 |
| 5,040,828 | A | * | 8/1991 | Kane | F16L 41/12 285/197 |
| 5,358,286 | A | * | 10/1994 | Eaton | F16L 47/30 285/197 |
| 5,374,087 | A | * | 12/1994 | Powers | F16L 41/12 285/133.21 |
| 5,797,423 | A | * | 8/1998 | Abbad | F16L 41/16 137/315.16 |
| 6,158,474 | A | * | 12/2000 | Ishikawa | F16L 41/12 138/109 |
| 6,364,367 | B1 | * | 4/2002 | Hintzen | B29C 65/342 285/197 |
| 6,412,824 | B2 | * | 7/2002 | Kunsman | F16L 41/12 277/626 |
| 8,176,929 | B1 | * | 5/2012 | Collins | F16L 41/12 137/15.12 |
| 8,439,408 | B2 | * | 5/2013 | Glocer | F16L 41/06 24/279 |
| 8,857,858 | B2 | * | 10/2014 | Minich | F16L 41/06 285/197 |
| 2003/0226412 | A1 | * | 12/2003 | Rumminger | F01N 13/008 73/866.5 |
| 2012/0193909 | A1 | * | 8/2012 | Minich | F16L 41/06 285/197 |

OTHER PUBLICATIONS

Ayotte Enterprises, Inc.; Product Image and Description for Ayotte A-320 Carbon Steel Tapping Sleeve titled "A-320 Carbon Steel Tapping Sleeve," publicly available prior to Mar. 10, 2015, 1 pg.

Mueller Co.; Specification sheet for Mechanical Joint Tapping Sleeve for Centrifugal C.I., D.I., & PVC Pipe, publicly available prior to Mar. 10, 2016, 4 pgs.

Mueller Co.; Specification Sheet for Mueller Tapping Material and Specialty Valves, publicly available prior to Mar. 10, 2016, 30 pgs.

Mueller Co.; Specification sheet for Stainless Steel Tapping Sleeve 4"-24", publicly available prior to Mar. 10, 2016, 4 pgs.

* cited by examiner

TAPPING SLEEVE WITH BENT ENDS

BACKGROUND

Field

This application relates to tapping sleeves, and more particularly, to tapping sleeves with bent ends.

Background Technology

Fluid distribution systems, such as water distribution systems and gas distribution systems, utilize pipelines to deliver fluid to various locations within the system. The pipelines conventionally can contain pipe elements that can be located above ground or buried within the ground. Often, it is necessary to add new branch lines to the pipelines to expand pipelines to deliver fluid to new locations. It is also common practice to install new branch lines to replace existing branch lines that are no longer serviceable. To connect the branch lines to the pipelines, tapping sleeves are conventionally utilized to allow for in-service tapping of the pipeline.

SUMMARY

Described herein is a tapping sleeve and a method of manufacturing a tapping sleeve. The tapping sleeve is configured for use with a pipe element. In one aspect, the tapping sleeve can comprise an outlet band having a front end, a back end, a first side end, a second side end and a cap band attached to the outlet band. A first bend line can be defined between the first side end and the second side end that extends from the front end to the back end and a second bend line can be defined between the first bend line and the second side end that extends from the front end to the back end. Further, an arcuate portion can be defined between the first bend line and the second bend line, a first flange can be defined between the first side end and the first bend line, and a second flange can be defined between the second side end and the second bend line.

In one aspect, the method of manufacturing a tapping sleeve can comprise: forming a first bend line in a planar outlet band between a first side end and a second side end of the planar outlet band; forming a second bend line in the planar outlet band between the first bend line and the second side end; and forming an arcuate portion between the first bend line and the second bend line.

In a further aspect, a method of assembling a tapping sleeve is disclosed that comprises: positioning an outlet band on a pipe element with an arcuate portion of the outlet band contacting an outer surface of the pipe element and adjustably attaching a cap band to the outlet band.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a band" can include two or more such bands unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or can not occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment. Directional references such as "up," "down," "top," "left," "right," "front," "back," and "corners," among others are intended to refer to the orientation as illustrated and described in the figure (or figures) to which the components and directions are referencing.

In one aspect, disclosed is a tapping sleeve and associated methods, systems, devices, and various apparatus. The tapping sleeve can comprise an outlet band and a cap band. It would be understood by one of skill in the art that the disclosed tapping sleeve is described in but a few exemplary aspects among many.

Figure 1:
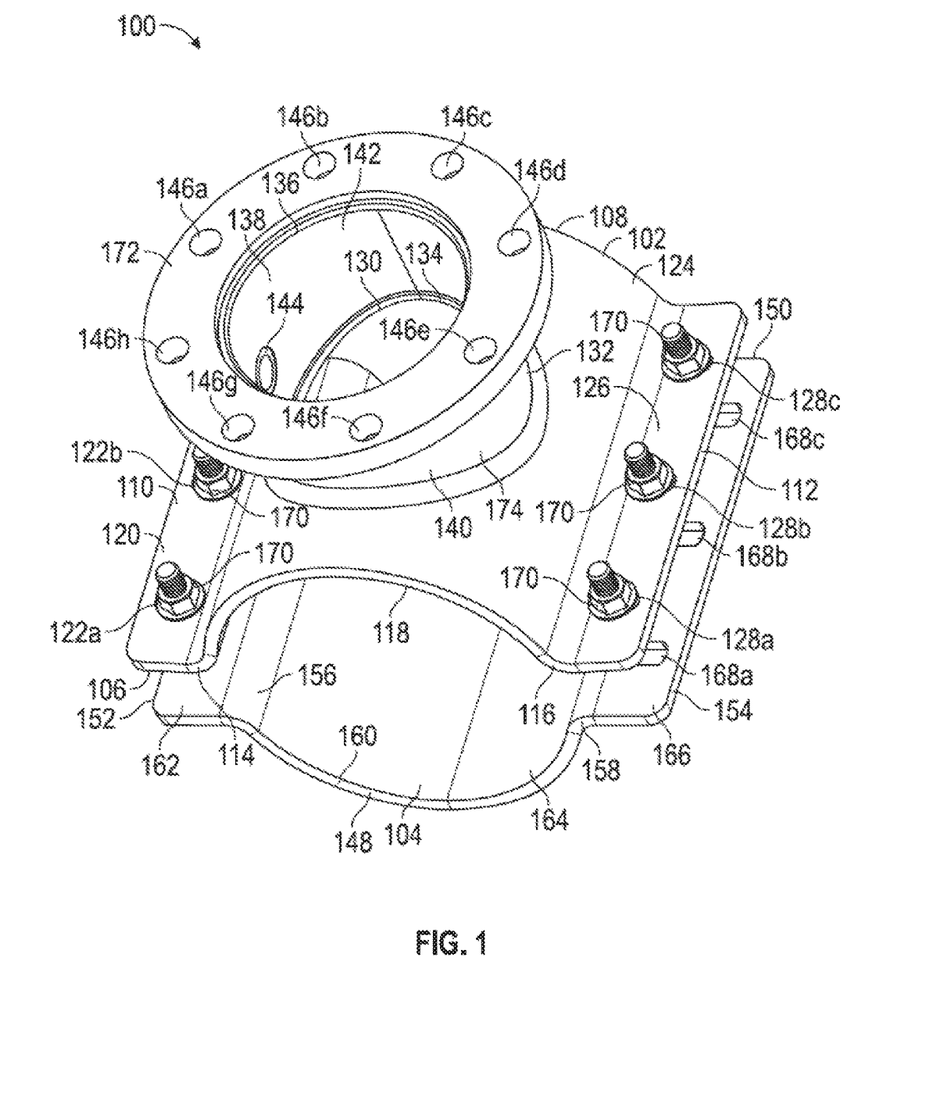
FIG. 1 is a perspective view of a tapping sleeve including an outlet band and a cap band in accordance with one embodiment of the current disclosure.

As shown in FIG. 1, a tapping sleeve 100 can comprise an outlet band 102. In one aspect, it is contemplated that the outlet band 102 can be continuously formed from a single sheet of material. For example and without limitation, the outlet band 102 can be continuously formed from a single sheet of sheet metal, such as a single sheet of steel, a single sheet of aluminum, a single sheet of copper, or various other types of sheet metal.

The outlet band 102 can comprise a front end 106, a back end 108, a first side end 110, and a second side end 112. In one aspect, a first bend line 114 is formed between the first side end 110 and the second side end 112. In this aspect, the first bend line 114 can extend from the front end 106 to the back end 108. Similarly, a second bend line 116 is formed between the first bend line 114 and the second side end 112. In this aspect, the second bend line 116 can extend from the front end 106 to the back end 108.

In another aspect, an arcuate portion 118 can be defined between the first bend line 114 and the second bend line 116. In various aspects, the arcuate portion 118 can be dimensioned or otherwise sized and shaped such that the outlet band 102 can be positioned on a pipe element. In one aspect, the arcuate portion 118 subtends an arc of approximately 180°; however, it is contemplated that the arcuate portion 118 can subtend at various other angular extents, such as, for example and without limitation, from between about 90° to about 180°, or various other angular extents.

Figure 2:
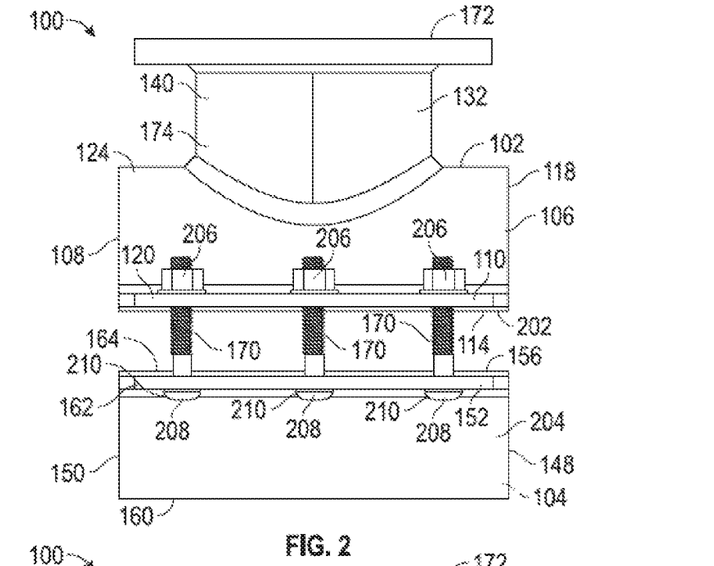
FIG. 2 is a side view of the tapping sleeve of FIG. 1.

In a further aspect, a first outlet flange 120 can be defined between the first side end 110 and the first bend line 114. Optionally, the first outlet flange 120 can define a plurality of first outlet securing bores 122a,b,c (the first outlet securing bore 122c exemplarily shown in FIG. 4). It will be appreciated that the number of first outlet securing bores 122 should not be considered limiting on the current disclosure as it is also contemplated that the first outlet flange 120 can define at least one first outlet securing bore 122. Referring to FIG. 2, the first outlet securing bores 122 are exemplarily defined through the first outlet flange 120 from a top surface 124 of the outlet band 102 to a bottom surface 202 of the outlet band 102.

Similarly, a second outlet flange 126 can be defined between the second side end 112 and the second bend line 116. Optionally, the second outlet flange 126 defines a plurality of second outlet securing bores 128a,b,c. The number of second outlet securing bores 128 should not be considered limiting as it is also contemplated that the second outlet flange 126 can define at least one second outlet securing bore 128. The second outlet securing bores 128 are exemplarily defined through the second outlet flange 126 from the top surface 124 to the bottom surface 202 of the outlet band 102.

In a further aspect, a tapping bore 130 can be formed in the arcuate portion 118 of the outlet band 102 between the first bend line 114 and the second bend line 116. The tapping bore 130 extends through the outlet band 102 from the top surface 124 to the bottom surface 202 of the outlet band 102. In various aspects, a neck 132 can be coupled to the outlet band 102. For example and without limitation, the neck 132 can be welded to the outlet band 102. As shown, the neck 132 can comprise a side wall 140 having a first end 134 and a second end 136. In this aspect, the side wall 140 comprises an inner surface 138 and an outer surface 174. It is contemplated that the inner surface 138 can define a neck bore 142 that extends from the first end 134 to the second end 136. Optionally, the side wall 140 can be a cylindrical shape such that the neck bore 142 defines a substantially circular-shaped bore. One skilled in the art will appreciated that other geometric shapes of the side wall 140 and neck bore 142 can be present. In a further aspect, the neck 132 can be secured to the outlet band 102 such that the neck bore 142 is in fluid communication with the tapping bore 130.

In one aspect, the neck 132 can define a plug bore 144 in the side wall 140. In this aspect, the plug bore 144 can extend through the side wall 140 from the inner surface 138 to the outer surface 174. Optionally, a plug (not shown) can be positioned in the plug bore 144 such that the plug bore 144 can be selectively sealed or can provide access to the neck bore 142. In one aspect, the neck 132 can also comprise a neck flange 172 at the second end 136 that defines a plurality of alignment holes 146a,b,c,d,e,f,g,h. The number of alignment holes 146 should not be considered limiting on the current disclosure as it is also contemplated that the neck flange 172 can define at least one alignment hole 146. In one aspect, the neck flange 172 can provide a location at which a pipe element of a branch line can be attached and secured to the tapping sleeve 100. It is contemplated that connectors or fasteners, such as, for example and without limitation, nuts and bolts, screws, pins, and various other types of connectors can be utilized with the alignment holes 146 to secure the pipe element of the branch line to the tapping sleeve 100. It is contemplated that the neck 132 can be configured as various types of outlets. For example and without limitation, it is contemplated that the neck 132 can be a mechanical joint outlet, a plain end outlet, a flanged outlet, or various other types of outlets.

In a further aspect, the tapping sleeve 100 can further comprise a cap band 104. Similar to the outlet band 102, the cap band 104 can be continuously formed from a single sheet of material, such as from a single sheet of sheet metal. In one aspect, the cap band 104 has a front end 148, a back end 150, a first side end 152, and a second side end 154. A first bend line 156 is formed between the first side end 152 and the second side end 154. In this aspect, the first bend line 156 can extend from the front end 148 to the back end 150. A second bend line 158 is formed between the first bend line 156 and the second side end 154. In this aspect, the second bend line 158 can extend from the front end 148 to the back end 150.

In another aspect, an arcuate portion 160 can be defined between the first bend line 156 and the second bend line 158. In various aspects, the arcuate portion 160 can be dimensioned or otherwise sized and shaped such that the cap band 104 can be positioned on the pipe element. In one aspect, the arcuate portion 160 subtends an arc at an angle from between about 90° to about 180°; however, it is contemplated that the arcuate portion 160 can subtend at various other angular extents. In one aspect, it is contemplated that the arcuate portion 160 of the cap band 104 can be substantially similar to the arcuate portion 118 of the outlet band 102.

In yet another aspect, a first cap flange 162 can be defined between the first side end 152 and the first bend line 156. The first cap flange 162 can define a plurality of first cap securing bores. In one aspect, the first cap securing bores can be defined through the first cap flange 162 from a top surface 164 of the cap band 104 to a bottom surface 204 (shown in FIG. 2) of the cap band 104. In this aspect, the first cap securing bores can be substantially similar to the first outlet securing bores 122. In one non-limiting example, the first cap flange 162 can define three first cap securing bores. However, the number of first cap securing bores should not be considered limiting on the current disclosure as it is also contemplated that the first cap flange 162 can define at least one first cap securing bore.

Similarly, a second cap flange 166 can be defined between the second side end 154 and the second bend line 158. In this aspect, the second cap flange 166 can define a plurality of second cap securing bores 168a,b,c. In one aspect, the second cap securing bores 168 can be defined through the second cap flange 166 from the top surface 164 to the bottom surface 204 of the cap band 104. In one aspect, the second cap securing bores 168 can be substantially similar to the first cap securing bores defined in the first cap flange 162. The number of second cap securing bores 168 should not be considered limiting on the current disclosure as it is also contemplated that the second cap flange 166 can define at least one second cap securing bore 168.

In a further aspect, the tapping sleeve 100 can comprise the cap band 104 positioned relative to the outlet band 102 such that the first outlet securing bores 122 are aligned with the first cap securing bores and the second outlet securing bores 128 are aligned with the second cap securing bores 168. Optionally, the cap band 104 can be attached to the outlet band 102 through connectors 170. For example and without limitation, it is contemplated that the connectors or fasteners 170 can be selected from the group including, but not limited to, nuts and bolts, pins, screws, hooks, and various other attachment mechanisms. As shown, the connectors 170 can be conventional bolts that are positioned in the aligned securing bores 122,128,168, respectively, and secured within the securing bores, respectively, through the use of conventional complementary nuts. In one aspect, the connectors 170 can also comprise a capture element (not shown) to further secure the connectors 170 in the respective securing bores.

Referring to FIG. 2, each connector 170 can comprise a nut 206 secured on a bolt 208. It is contemplated that other types of connectors 170 can be utilized in various other aspects. In one non-limiting example, the tapping sleeve 100 can comprise three connectors 170 that are positioned in the aligned first outlet securing bores 122 and first cap securing bores, respectively, and three connectors 170 that are positioned in the aligned second outlet securing bores 128 and second cap securing bores 168, respectively. In the exemplary aspect where the connectors 170 comprise the nuts 206 and bolts 208, each connector 170 can be positioned such that the nut 206 is engageable with one of the top surface 124 of the outlet band 102 and the bottom surface 204 of the cap band 104, and a head 210 of the bolt 208 of each connector 170, respectively, is engageable with the top surface 124 or the bottom surface 204 to which the nut 206 is not engaged.

Figure 3:
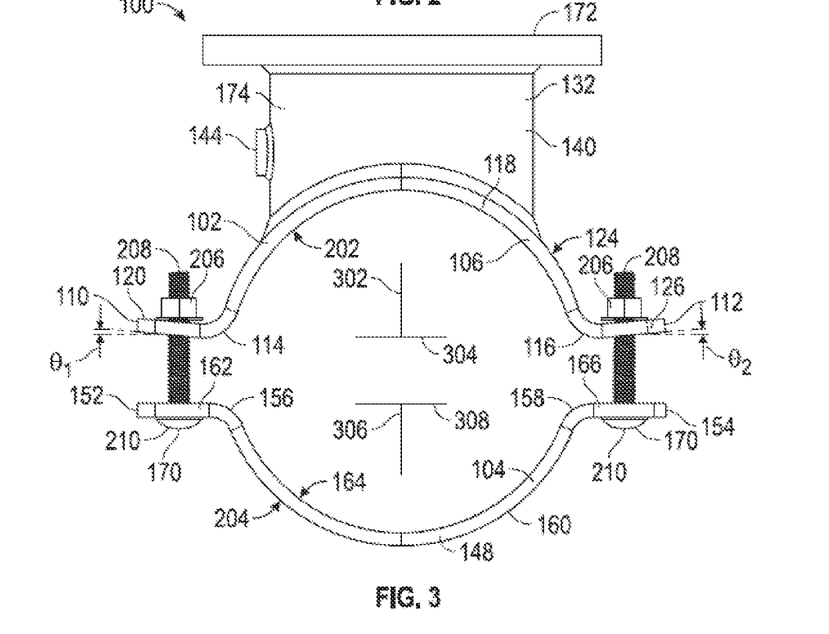
FIG. 3 is a front view of the tapping sleeve of FIG. 1.

Referring now to FIG. 3, the arcuate portion 118 of the outlet band 102 can define a curved profile that is configured such that the bottom surface 202 of the outlet band 102 is positionable or configurable around at least a portion of a pipe element. In a further aspect, the arcuate portion 160 of the cap band 104 can also define a curved profile that is configured such that the top surface 164 of the cap band 104 is positionable or configurable around at least a portion of the pipe element.

In one aspect, the outlet band 102 can comprise an x-axis 304 and a y-axis 302. In various aspects, the first outlet flange 120 can be angled at an angle $\theta_1$ with respect to the x-axis 304 and the second outlet flange 126 can be angled at an angle $\theta_2$ with respect to the x-axis 304. Optionally, the angles $\theta_1, \theta_2$ can respectively preferably range from between about 0° to about 20°, more preferably from between about 0° to about 10°, and most preferably from between about 0° to about 5° with respect to the x-axis 304. In one aspect, the angle $\theta_1$ can be the same as the angle $\theta_2$ or, optionally, the angle $\theta_1$ can be different than the angle $\theta_2$. It will be appreciated that, depending on the angles $\theta_1, \theta_2$, the first outlet flange 120 can be non-coplanar with the second outlet flange 126 or can be coplanar with the second outlet flange 126.

In another aspect, the cap band 104 can comprise a y-axis 306 and an x-axis 308. In one aspect, the first cap flange 162 and the second cap flange 166 can be coplanar and can be not angled with respect to the x-axis 308. Optionally, each of the first cap flange 162 and the second cap flange 166 can be angled with respect to the x-axis 308 such that the first cap flange 162 and the second cap flange 166 are non-coplanar. It is contemplated that the first cap flange 162 and the second cap flange 166 can be angled similarly to the first outlet flange 120 and the second outlet flange 126 in various aspects.

Figure 4:
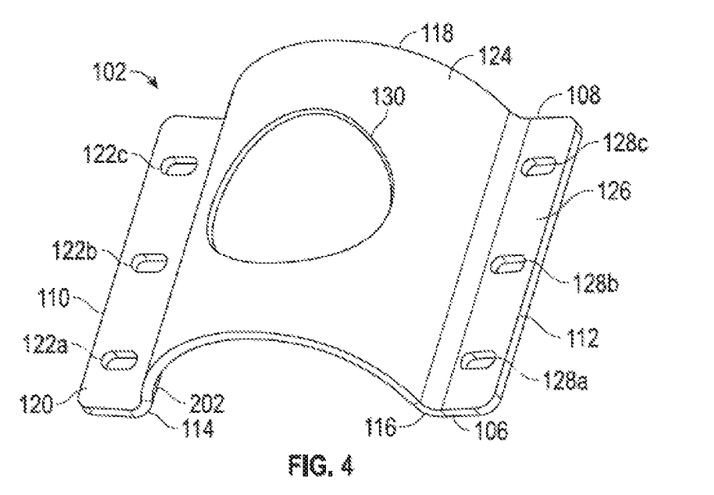
FIG. 4 is a perspective view of the outlet band of FIG. 1.

Referring now to FIGS. 4-7, the outlet band 102 without the neck 132 secured is illustrated. As shown in FIG. 4, the tapping bore 130 can be defined in the arcuate portion 118 between the first bend line 114 and the second bend line 116 and can extend from the top surface 124 to the bottom surface 202 of the outlet band 102.

Figure 5:
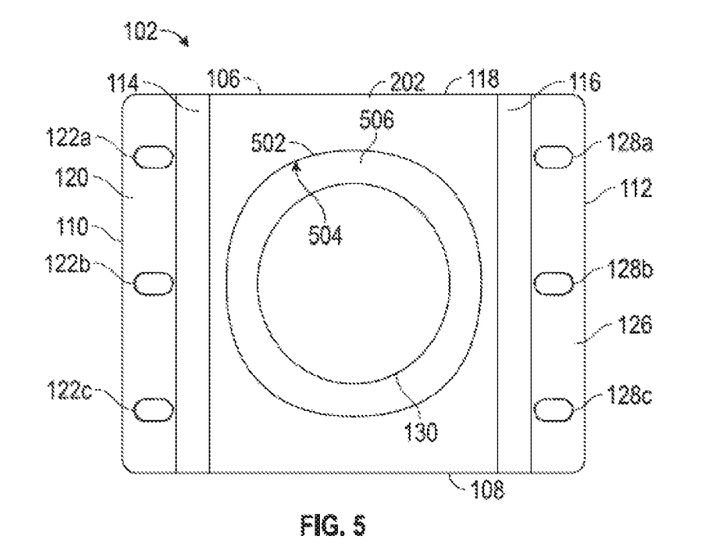
FIG. 5 is a bottom view of the outlet band of FIG. 1.

As shown in FIGS. 4 and 5, the securing bores 122,128 can define oblong shapes, respectively. Optionally, the securing bores 122,128 can have any desired geometric shape that is suitable and configured for securing the connectors 170 within the securing bores 122,128, respectively.

FIG. 5 illustrates a bottom view of the outlet band 102 and shows a gasket groove 502 that can be defined in the bottom surface 202 and that surrounds the tapping bore 130. The gasket groove 502 can comprise a side wall surface 504 and a bottom surface 506. As illustrated, in one aspect the gasket groove 502 can be defined around a perimeter of the tapping bore 130. Optionally, the gasket groove 502 can be dimensioned or otherwise configured to accept a conventional gasket within the gasket groove 502. In operation, when the outlet band 102 is positioned on the pipe element, the gasket positioned within the gasket groove 502 can operatively form a seal around the tapping bore 130 between the outlet band 102 and the pipe element.

Figure 6:
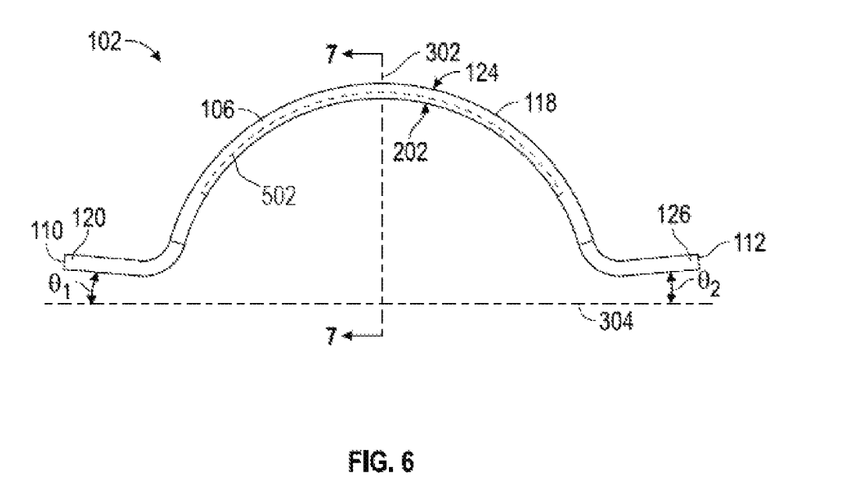
FIG. 6 is a front view of the outlet band of FIG. 1.
Figure 7:
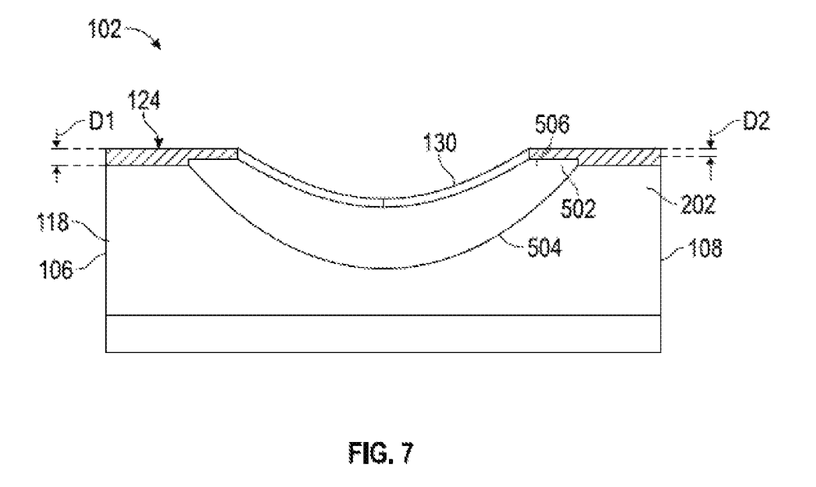
FIG. 7 is a sectional view of the outlet band of FIG. 1 taken along line 7-7 in FIG. 6.

Referring to FIGS. 6 and 7, the outlet band 102 is illustrated with the first outlet flange 120 angled at angle $\theta_1$ with respect to the x-axis 304 and with the second outlet flange 126 angled at angle $\theta_2$ with respect to the x-axis 304. In one aspect, the gasket groove 502 can be defined around the perimeter of the tapping bore 130. In a further aspect, optionally, a main thickness $D_1$ of the outlet band 102, which is a thickness as measured from the bottom surface 202 to the top surface 124, can be greater than a gasket groove thickness $D_2$, which is a thickness as measured from the bottom surface 506 of the gasket groove 502 to the top surface 124 of the outlet band 102. In one aspect, one skilled in the art will appreciate that the cap band 104 can be shaped and look substantially similar to the outlet band 102 except that the cap band 104 does not define the tapping bore 130 or the gasket groove 502.

Figure 8:
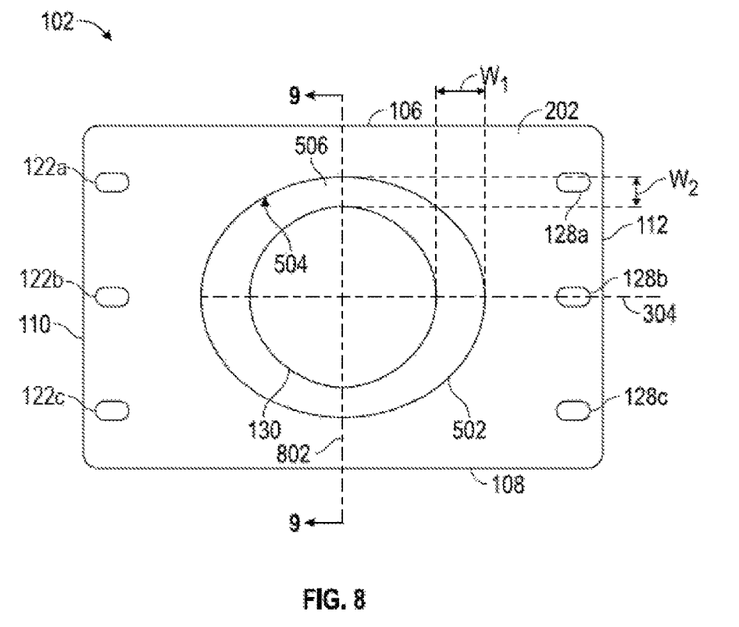
FIG. 8 is a bottom view of the outlet band of FIG. 1 prior to forming an arcuate portion.
Figure 9:
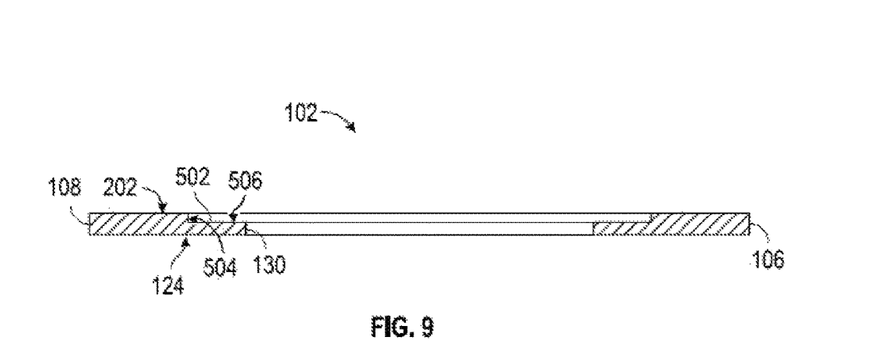
FIG. 9 is a sectional view of the outlet band of FIG. 8 taken along line 9-9 in FIG. 8.

Referring to FIGS. 8 and 9, the outlet band 102 is shown as a sheet of material prior to manufacturing. In one aspect, the gasket groove 502 can have an oblong shape such that a width $W_1$ of the gasket groove 502, which is a distance from the tapping bore 130 to the side wall surface 504 as measured along the x-axis 304, is greater than a width $W_2$ of the gasket groove 502, which is a distance from the tapping bore 130 to the side wall surface 504 as measured along a z-axis 802 of the outlet band 102. Optionally, it is contemplated that $W_1$ can be equal to $W_2$ or $W_1$ can be less than $W_2$.

In a further aspect, a method of manufacturing the tapping sleeve 100 is provided. In one aspect, the method can comprise forming a planar outlet band 102 from a continuous sheet of material. In another aspect, the method can comprise forming the first bend line 114 in the planar outlet band 102 between the first side end 110 and the second side end 112 of the planar outlet band 102. In this aspect, the step of forming the first bend line 114 can comprise extending the first bend line 114 from the front end 106 to the back end 108 of the planar outlet band 102. As illustrated, it is contemplated that the step of forming the first bend line 114 can define the first outlet flange 120 between the first side end 110 of the outlet band 102 and the first bend line 114.

The method can further comprise forming the second bend line 116 in the planar outlet band 102 between the first bend line 114 and the second side end 112 of the planar outlet band 102. In this aspect, the step of forming the second bend line 116 can comprise extending the second bend line 116 from the front end 106 to the back end 108 of the outlet band 102. As illustrated, the method of forming the second bend line 116 can define the second outlet flange 126 between the second side end 112 and the second bend line 116. In another aspect, the method can further comprise forming the arcuate portion 118 between the first bend line 114 and the second bend line 116. Optionally, and as described in more detail above, the arcuate portion 118 can subtend at an angle from between about 90° to about 180°.

In other aspects, it is contemplated that one or more of the securing bores 122, the securing bores 128, the tapping bore 130, and the gasket groove 502 can be formed in the outlet band 102, respectively, before one or more of the first bend line 114, the second bend line 116, and the arcuate portion 118 are formed during a manufacturing process. Optionally, it is contemplated that one or more of the securing bores 122, the securing bores 128, the tapping bore 130, and the gasket groove 502 are formed in the outlet band 102, respectively, after forming any one of the first bend line 114, the second bend line 116, and the arcuate portion 118 during the manufacturing process. As described in more detail above, one or more of the securing bores 122, the securing bores 128, and the tapping bore 130 can be formed in the outlet band 102 such that they extend, respectively, through the outlet band 102 from the top surface 124 to the bottom surface 202. In another aspect, as described in more detail above, the gasket groove 502 can be formed in the bottom surface 202 of the outlet band around the perimeter of the tapping bore 130.

In one aspect, the method can further comprise angling the first outlet flange 120 with respect to the x-axis 304 by the angle $\theta_1$ and angling the second outlet flange 126 with respect to the x-axis 304 by the angle $\theta_2$. In one aspect, the angle $\theta_1$ between the first outlet flange 120 and the x-axis 304 and the angle $\theta_2$ between the second outlet flange 126 and the x-axis 304 can preferably range from between about 0° to about 20°, more preferably from between about 0° to about 10°, and most preferably from between about 0° to about 5° with respect to the x-axis 304. In another aspect, the first outlet flange 120 and the second outlet flange 126 can respectively be angled such that the first outlet flange 120 and the second outlet flange 126 are non-coplanar after being angled with respect to the x-axis 304.

The method can further comprise securing the neck 132 to the outlet band 102. In one aspect, the neck 132 can be welded to the outlet band 102. Alternatively, in another aspect, the neck 132 can be integral with the outlet band 102 and can be formed from the same material as the outlet band 102. In this aspect, the neck 132 can be formed through a technique such as the non-limiting example of hydro-forming. In one aspect, the step of securing the neck 132 to the outlet band 102 can comprise aligning the neck bore 142 of the neck 132 with the tapping bore 130 of the outlet band 102 such that the neck bore 142 is in fluid communication with the tapping bore 130. Optionally, it is contemplated that the method can further comprise positioning a gasket within the gasket groove 502 formed in the bottom surface 202 of the outlet band 102.

In one exemplary aspect, in which the tapping sleeve 100 comprises the cap band 104, the method can further comprise forming a planar cap band 104 from a continuous sheet of material, which can be similar to the outlet band 102 but omitting the tapping bore 130 and the gasket groove 502. In this aspect, the method can further comprise forming the first bend line 156 in the planar cap band 104 between the first side end 152 and the second side end 154 of the planar outlet cap band 104 and, optionally, extending the first bend line 156 from the front end 148 to the back end 150 of the planar cap band 104. As illustrated, it is contemplated that the step of forming the first bend line 156 can define the first cap flange 162 between the first side end 152 of the cap band 104 and the first bend line 156.

In a further aspect, the method can comprise forming the second bend line 158 in the planar cap band 104 between the first bend line 156 and the second side end 154 of the planar cap band 104 and, optionally, extending the second bend line 158 from the front end 148 to the back end 150 of the cap band 104. As illustrated, it is contemplated that forming the second bend line 158 can define the second cap flange 166 between the second side end 154 and the second bend line 158. In a further aspect, the method can comprise forming the arcuate portion 160 between the first bend line 156 and the second bend line 158 such that the arcuate portion 160 subtends at an angle from between about 90° to about 180°.

Optionally, the securing bores in the first cap flange 162 and the securing bores 168 can be formed in the cap band 104, respectively, before the first bend line 156 and the second bend line 158 are formed during a manufacturing process or the securing bores in the first cap flange 162 and the securing bores 168 can be formed in the cap band 104 after forming any one of the first bend line 156 and the second bend line 158 during the manufacturing process. As described in more detail above, each of the securing bores in the first cap flange 162 and the securing bores 168 can be formed in the cap band 104 such that they extend, respectively, through the cap band 104 from the top surface 164 to the bottom surface 204.

In one aspect, forming the arcuate portion 160 can comprise bending the cap band 104 such that the arcuate portion 160 is substantially similar to the arcuate portion 118 of the outlet band 102. In one aspect, it is contemplated that the arcuate portion 160 and the arcuate portion 118 can be dimensioned to enable the cap band 104 and the outlet band 102, respectively, to be fitted on a conventional pipe element. In another aspect, the method further can comprise aligning the first outlet securing bores 122 with the first cap securing bores in the first cap flange 162 and subsequently attaching the cap band 104 to the outlet band 102 through the connectors 170 positioned in the aligned bores, respectively. Similarly, the method can comprise aligning the second outlet securing bores 128 with the second cap securing bores 168 and subsequently attaching the cap band 104 to the outlet band 102 through the connectors 170 positioned in the aligned bores 128,168, respectively.

Figure 10:
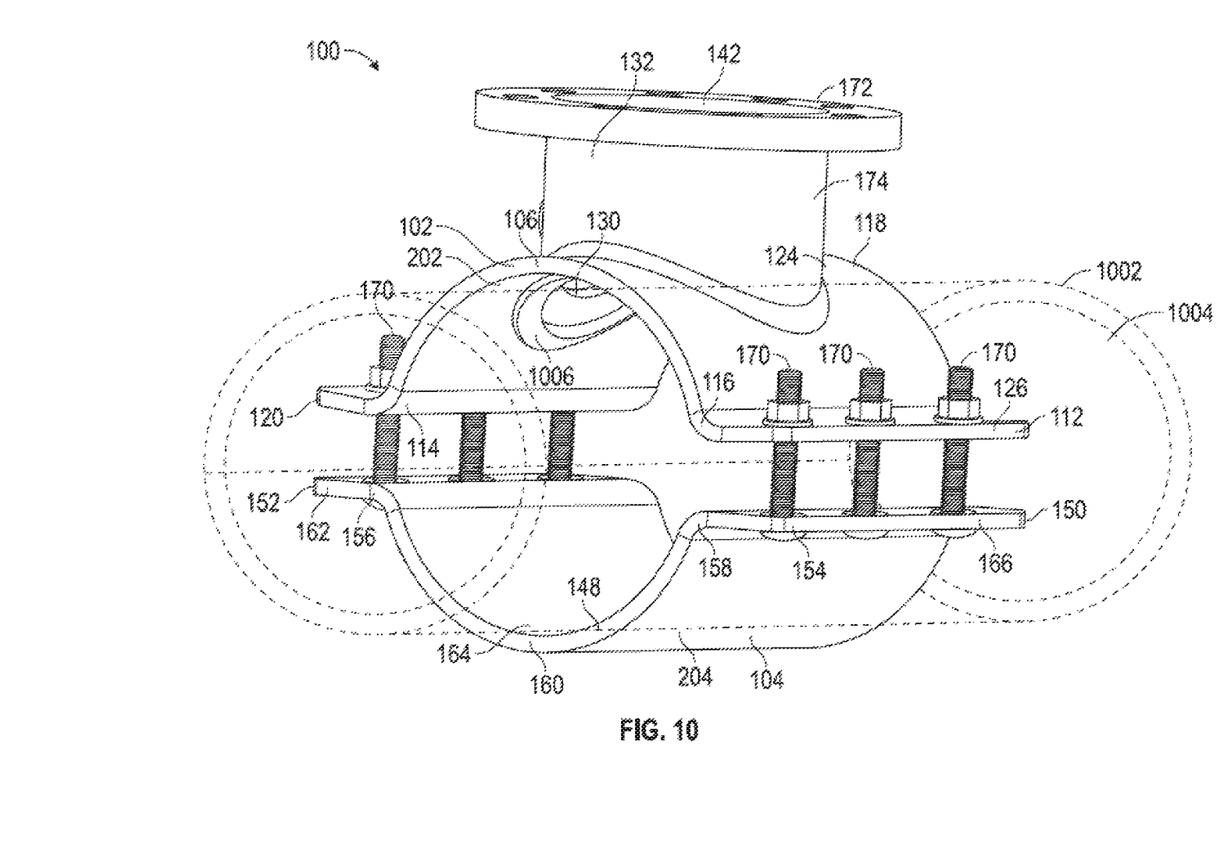
FIG. 10 is a perspective view of the tapping sleeve of FIG. 1 positioned on a pipe element.

Referring to FIG. 10, the tapping sleeve 100 is shown positioned on a conventional pipe element 1002. The pipe element 1002 comprises an outer surface 1004. In one exemplary aspect, a method of assembling the tapping sleeve 100 can comprise positioning the outlet band 102 on the pipe element 1002 with the arcuate portion 118 of the outlet band 102 contacting the outer surface 1004 of the pipe element 1002. In this aspect, the bottom surface 202 of the outlet band 102 at the arcuate portion 118 can contact a portion of the outer surface 1004 of the pipe element 1002. In another aspect, the step of positioning the outlet band 102 on the pipe element 1002 can comprise placing a gasket 1006, which is positioned in the gasket groove 502 surrounding the tapping bore 130, against the pipe element 1002 and into sealing engagement with the pipe element 1002.

In one aspect, the method can further comprise adjustably attaching the cap band 104 to the outlet band 102. In one exemplary aspect, the step of adjustably attaching the cap band 104 can comprise securing the cap band 104 to the outlet band 102 through the use of connectors 170. In one aspect, adjustably attaching the cap band 104 to the outlet band 102 can comprise securing the outlet band 102 to the cap band 104 around the pipe element 1002. Optionally, the step of securing the outlet band 102 to the cap band 104 can further comprise bending the first outlet flange 120 via the connectors 170 and bending the second outlet flange 126 via the connectors 170 from angled positions, respectively, such that the first outlet flange 120 and the second outlet flange 126 are substantially coplanar. In this aspect, the step of adjustably attaching the cap band 104 can further comprise positioning the arcuate portion 160 of the cap band on the pipe element 1002. In one aspect, it is contemplated that the step of adjustably attaching the cap band 104 can comprise bending the first cap flange 162 and the second cap flange 166 via connectors 170, respectively, such that the first cap flange 162 and the second cap flange 166 are substantially coplanar. In another aspect, the step of positioning the arcuate portion 160 can comprise placing the top surface 164 of the cap band 104 at the arcuate portion 160 on the outer surface 1004 of the pipe element 1002.

Figure 11:
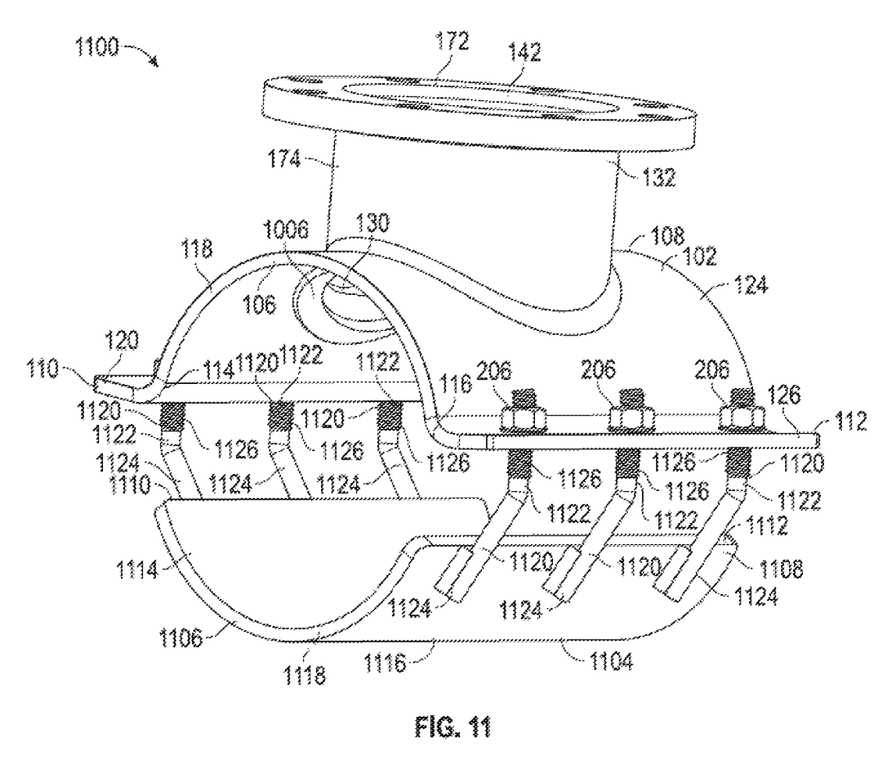
FIG. 11 is a perspective view of another embodiment of a tapping sleeve.
Figure 12:
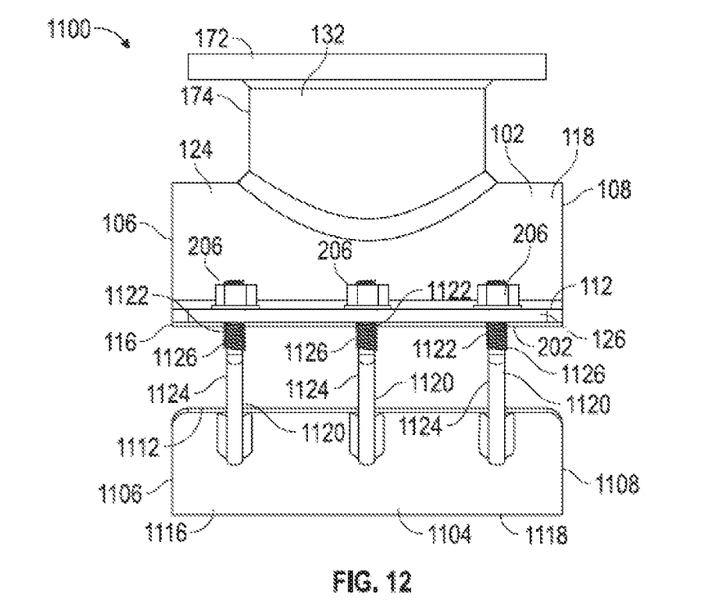
FIG. 12 is a side view of the tapping sleeve of FIG. 11.
Figure 13:
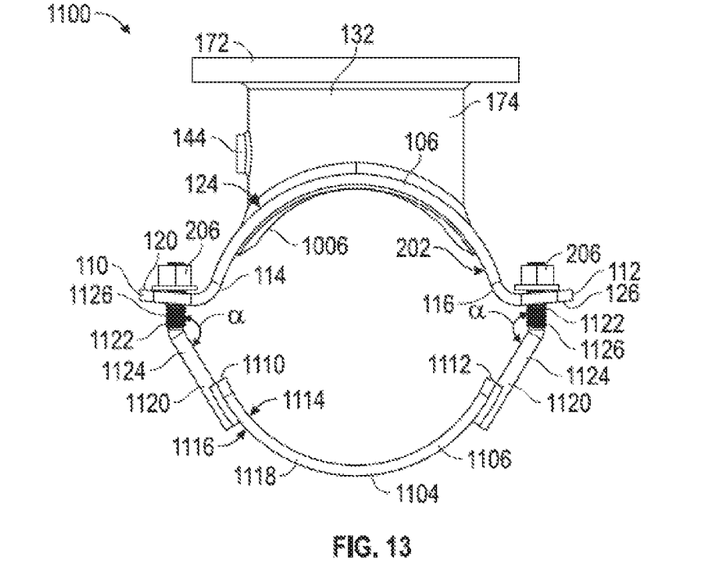
FIG. 13 is a front view of the tapping sleeve of FIG. 11.

Referring to FIGS. 11-13, an exemplary tapping sleeve 1100 is illustrated. In this aspect, the tapping sleeve 1100 can comprise the outlet band 102 and a cap band 1104. As shown, and without limitation, the cap band 1104 can be continuously formed from a single sheet of material, such as from a single sheet of sheet metal. In this aspect, the cap band 1104 comprises a front end 1106, a back end 1108, a first side end 1110, and a second side end 1112. The cap band 1104 further comprises a top surface 1114 and a bottom surface 1116. The cap band 1104 defines an arcuate portion 1118 between the first side end 1110 and the second side end 1112. In various aspects, the arcuate portion 1118 is dimensioned such that the cap band 1104 can be positioned on a conventional pipe element and, as described in more detail above, can be formed to subtend an arc at an angle from between about 90° to about 180°; however, optionally, it is contemplated that the arcuate portion 1118 can be formed to subtend at various other angular extents.

In a further aspect, the cap band 1104 can comprise a plurality of connectors 1120 secured to the bottom surface 1116 of the cap band 1104. In one exemplar aspect, and without limitation, the connectors 1120 can be welded to the bottom surface 1116 of the cap band 1104. One skilled in the art will appreciate that the number of connectors 1120 secured to the cap band 1104 should not be considered limiting on the current disclosure as it is also contemplated that the cap band 1104 can comprise at least one connector 1120 secured to the cap band 1104. In one aspect, the number of connectors 1120 secured to the cap band 1104 can correspond with the number of first outlet securing bores 122 and the number of second outlet securing bores 128, respectively.

In one aspect, each connector 1120 can comprise a first portion 1122 that is angled relative to a second portion 1124 at an angle $\alpha$. In various aspects, the angle $\alpha$ can be an angle from between about 0° to about 90°. The extent to which each first portion 1122 is angled relative to each second portion 1124, respectively, can be varied depending on particular use of the tapping sleeve 1100. In one aspect, each first portion 1122 can be angled relative to each second portion 1124, respectively, such that the connectors 1120 can both be secured to the cap band 1104 and positionable in the securing bores 122,128, respectively, of the outlet band 102. In one exemplary aspect, each first portion 1122 can comprise a threading portion 1126 that is complementarily engageable with the nut 206.

Figure 14:
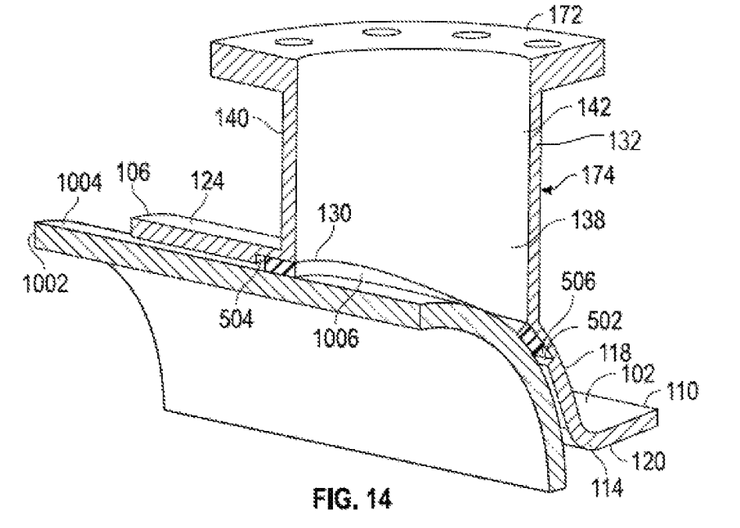
FIG. 14 is a sectional view of the outlet band of FIG. 1 on the pipe element of FIG. 10.

In FIG. 14, the gasket 1006 is exemplarily shown positioned in the gasket groove 502 and surrounding the tapping bore 130. In this aspect, the gasket 1006 can contact the bottom surface 506 of the gasket groove 502. In another aspect, in which the outlet band 102 is positioned on the pipe element 1002, the gasket 1006 can be placed against the pipe element 1002. In these aspects, it is contemplated that the gasket 1006 can be placed against the outer surface 1004 of the pipe element 1002 and into sealing engagement with the pipe element 1002.

Figure 15:
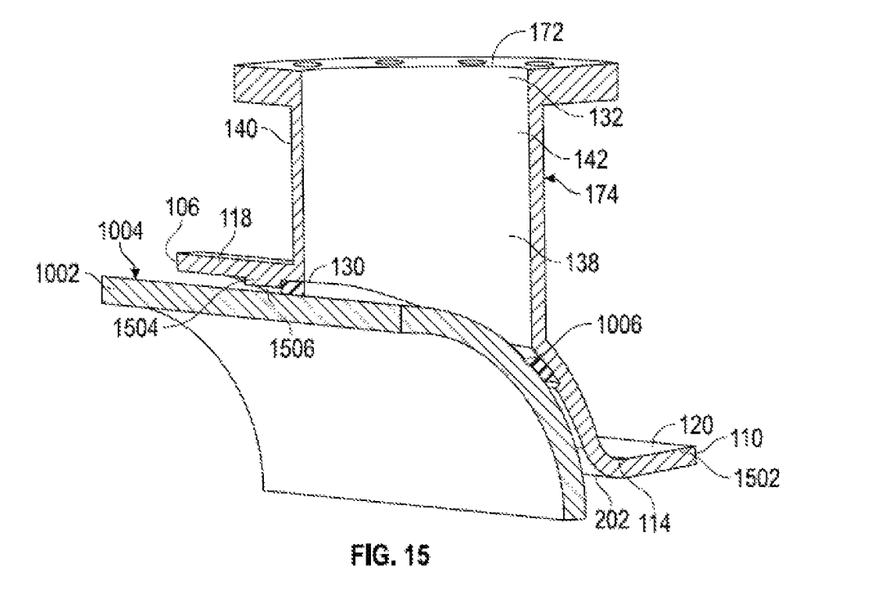
FIG. 15 is a sectional view of another embodiment of an outlet band on the pipe element of FIG. 10.

Referring now to FIG. 15, an outlet band 1502 is shown operatively coupled on the pipe element 1002. In this aspect, it is contemplated that the outlet band 1502 can be substantially similar to the outlet band 102 except that the outlet band 1502 does not define the gasket groove 502 around the perimeter of the tapping bore 130. Instead, in this exemplary aspect, the outlet band 1502 can define a rib 1504 on the bottom surface 202 of the outlet band 1502 that surrounds the perimeter of the tapping bore 130. In this aspect, the rib 1504 can define a rib surface 1506 that can extend downwards relative to the bottom surface 202 of the outlet band 102. In one aspect, it is contemplated that the gasket 1006 can be operatively positioned such that a portion of the gasket 1006 contacts the bottom surface 202 of the outlet band 1502 and a portion of the gasket 1006 contacts the rib surface 1506 of the rib 1504. Thus, in this aspect, the rib 1504 can be utilized to position the gasket 1006 around the tapping bore 130.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

That which is claimed is:

1. A tapping sleeve for a pipe element, the tapping sleeve comprising:
    an outlet band continuously formed from a single sheet of material, the single sheet of material defining:
        a front end,
        a back end,
        a first side end,
        a second side end,
        a first bend line extending from the front end to the back end,
        a second bend line extending from the front end to the back end,
        an arcuate portion defined between the first bend line and the second bend line,
        a first flange extending between the first side end and the first bend line, the first flange bent about the first bend line relative to the arcuate portion, and
        a second flange extending between the second side end and the second bend line, the second flange bent about the second bend line relative to the arcuate portion; and
    a cap band attached to the outlet band,
    wherein a first outlet securing bore is defined between the first side end and the first bend line, the first outlet securing bore extending through the first flange.

2. The tapping sleeve of claim 1, further comprising a neck secured to the outlet band such that a neck bore of the neck is in fluid communication with a tapping bore defined by the outlet band.

3. The tapping sleeve of claim 1, wherein the outlet band defines a second outlet securing bore between the second side end and the second bend line, and wherein the cap band is attached to the outlet band via a first connector positioned in the first outlet securing bore and a second connector positioned in the second outlet securing bore.

4. The tapping sleeve of claim 1, wherein the outlet band defines a tapping bore extending from an outer surface of the outlet band through the outlet band to an inner surface of the outlet band, and wherein the first flange and the second flange are angled with respect to an x-axis of the outlet band.

5. The tapping sleeve of claim 4, wherein the first flange and the second flange are each angled between about 0° and about 5° with respect to the x-axis of the outlet band.

6. The tapping sleeve of claim 1, further comprising a connector, a first portion of the connector extending through the first outlet securing bore, a second portion of the connector attached to the cap band, and the first portion of the connector being angled relative to the second portion of the connector.

7. A tapping sleeve for a pipe element, the tapping sleeve comprising:
    an outlet band continuously formed from a single sheet of material, the single sheet of material defining:
        a front end,
        a back end,
        a first side end,
        a second side end,
        a first bend line extending from the front end to the back end,
        a second bend line extending from the front end to the back end,
        an arcuate portion defined between the first bend line and the second bend line,
        a first flange extending between the first side end and the first bend line, the first flange bent about the first bend line relative to the arcuate portion, and
        a second flange extending between the second side end and the second bend line, the second flange bent about the second bend line relative to the arcuate portion;
    and a cap band attached to the outlet band; and
    a connector, a first portion of the connector engaging the first flange, a second portion of the connector attached to the cap band, and the first portion of the connector being angled relative to the second portion of the connector;
    wherein the second portion of the connector is welded to the cap band.

8. The tapping sleeve of claim 7, wherein the second portion of the connector is positioned tangential to a bottom surface of the cap band, and wherein the second portion is welded to the bottom surface.

9. The tapping sleeve of claim 7, wherein the first portion of the connector is threaded.

10. The tapping sleeve of claim 7, wherein:
    the connector is a first connector;
    the tapping sleeve further comprises a second connector attached to the cap band; and
    the second connector engages the second flange.

11. The tapping sleeve of claim 7, wherein the first portion of the connector is angled relative to the second portion of the connector at an angle between 0° and 90°.

12. The tapping sleeve of claim 7, wherein the outlet band defines a tapping bore extending from an outer surface of the outlet band through the outlet band to an inner surface of the outlet band, and wherein the first flange and the second flange are angled with respect to an x-axis of the outlet band.

13. The tapping sleeve of claim 12, wherein the first flange and the second flange are each angled between about 0° and about 5° with respect to the x-axis of the outlet band.

* * * * *